No. 735,574. PATENTED AUG. 4, 1903.
G. OTT.
SOLDERING APPARATUS FOR BAND SAWS.
APPLICATION FILED JULY 1, 1902.
NO MODEL

Witnesses:
H. W. Bormann
M. Bormann

Inventor:
Georg Ott
By Hermann Bormann
Att'y

No. 735,574. Patented August 4, 1903.

UNITED STATES PATENT OFFICE.

GEORG OTT, OF ULM, GERMANY.

SOLDERING APPARATUS FOR BAND-SAWS.

SPECIFICATION forming part of Letters Patent No. 735,574, dated August 4, 1903.

Application filed July 1, 1902. Serial No. 114,017. (No model.)

*To all whom it may concern:*

Be it known that I, GEORG OTT, a subject of the King of Würtemberg, residing at Ulm-on-the-Donau, in the Kingdom of Würtemberg, and Empire of Germany, have invented a new and useful Improved Soldering Apparatus for Band-Saws, of which the following is a specification.

My invention relates to an improved soldering apparatus for band-saws.

The apparatus hitherto employed for soldering band-saws have the disadvantage that the thin flame which serves for heating the sutures is free and thereby exposed to the air-currents, so that it is impossible to concentrate the heat of the soldering-flame on the suture only, and the continuous cooling of the latter by the air which surrounds and passes over it prevents a quick and reliable heating of the solder, such as is necessary for bringing it to the melting-point.

The object of the present invention is to concentrate the whole of the heat generated by the thin flame employed for the soldering on the suture itself and to shut off the heating-flame and the whole suture from the surrounding air, so that no objectionable action may be caused by air-currents.

In the accompanying drawings the improved soldering apparatus for band-saws is illustrated.

Figure 1:
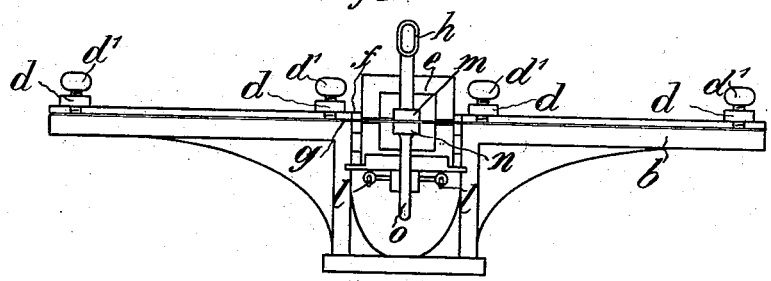
Figure 4:
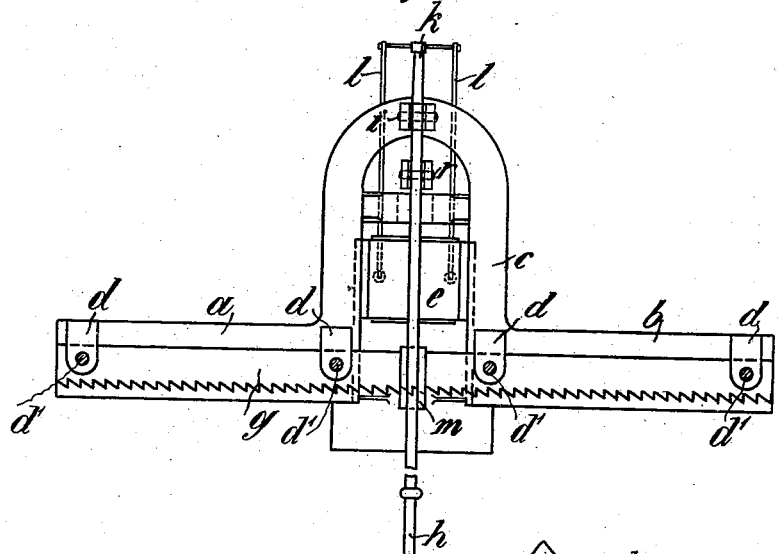
Figure 3:
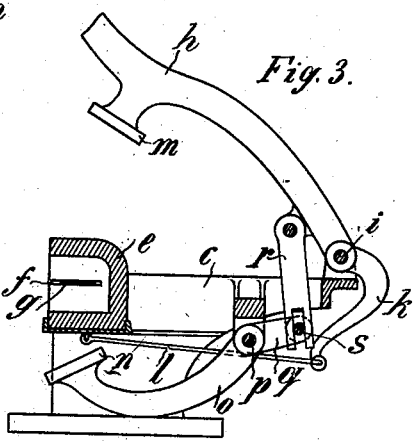
Figure 2:
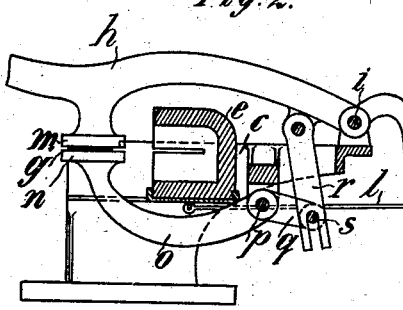

Figure 1 is a front view, Figs. 2 and 3 transverse vertical sections showing the apparatus in different positions, and Fig. 4 a plan of the same.

The apparatus consists of two trestles $a$ and $b$, firmly connected with one another by means of a horseshoe-shaped piece $c$, so as to form a U-shaped frame in plan, Fig. 4. The surfaces of these trestles lie in the same plane and serve as supports for the ends of the saw-blade to be soldered, which can be secured in proper position relatively to each other by means of clamping devices provided on the trestles. In the example illustrated in the drawings the clamping devices consist of set-screws $d'$, which are arranged in arms $d$, that extend over the saw-blade.

A novel and peculiar feature is the arrangement of a fireproof casing $e$, which is open in front and furnished with transverse slots $f$ in the sides for admitting the saw-blades, Fig. 3. The soldering-flame is directed into the interior of the casing $e$ and the whole effect thereof concentrated on the suture, the flame as well as the latter being likewise protected against the action of air-currents and the surrounding atmosphere. In this manner an exceedingly quick melting of the solder is effected.

After the solder is melted it is expedient to remove the casing $e$, so that the parts of the band-saw to be soldered together may be compressed by means of pressing-tongs. If the casing $e$ be fixed in relation to the suture, the clear height thereof must be such as to allow of the introduction of the jaws of the pressing-tongs. For this reason in the example illustrated the casing $e$ is arranged so as to be movable transversely to the saw-blade $g$, the movement of the casing being effected by means of the hand-lever $h$, which is pivoted to the frame part $c$ of the apparatus by means of a bolt $i$, so as to be turned in the vertical plane. This hand-lever $h$ has a second arm $k$, the free end of which is connected with the casing $e$ by means of the links $l$.

If the lever $h$ be moved into the position shown in Fig. 3, the casing $e$ will be pushed over the suture—that is to say, the ends of the band-saw—the saw entering the slots $f$, formed in the sides of the casing. When the lever $h$ is lowered into the position shown in Fig. 2, the casing $e$ is drawn away from the point where the soldering takes place, so as to allow of the compression of the ends of the saw by means of pressing-tongs.

In using a particular kind of pressing-tongs for compressing the ends of the band-saw at the suture after the solder has melted it is necessary to work the lever $h$ and also the tongs. If the compression of the suture is to be effected as quickly and reliably as possible, it is desirable to employ two workmen for working the apparatus—one who removes the casing $e$ and the soldering-flame from the suture by means of the lever $h$ and another who holds the tongs ready for compressing the ends of the saw, so as to be able to at once manipulate suitably. In the example illustrated this troublesome working of the apparatus is avoided, the tongs employed for compressing the ends of the saw at the suture being provided in the apparatus itself and connected therewith by means of the lever $h$, which serves for pushing the casing $e$ backward and forward. For this purpose one jaw $m$ of the pressing-tongs is attached to the hand-lever $h$, the second jaw $n$ being fixed to an arm $o$ of a lever turning in the vertical plane around a pin $p$, while the other arm $q$ of this lever is connected with the hand-lever $h$ by means of a rod $r$. The connecting-rod $r$ straddles the pin $s$ in the lever-arm $q$ by means of its lower forked end, so that the lever $h$ can turn to a relatively greater extent than the lever $o\ q$, whereby the height of the apparatus is reduced.

In forcing the handle $h$ with jaw $m$ downward the rod $r$, acting on the pin $s$ of the arm $q$, causes the jaw $n$ on the arm $o$ to move upwardly, it being understood that the arms $o$ and $q$ are made of one piece and pivoted at $p$. By removing the pressure from the handle $h$ the arms $o$ and $q$ occupy a position as shown in Fig. 3, while the handle $h$, due to the slotted lower end of the rod $r$, may be raised.

When the casing $e$ is in the position shown in Fig. 3, the jaws $m$ and $n$ are open. The solder being melted, the hand-lever $h$ is lowered, whereby the casing $e$ is drawn back and the jaws $m$ and $n$ at the same time moved toward one another, so as to compress the ends of the saw at the suture in the closing position shown in Fig. 2.

What I claim as my invention, and desire to secure by Letters Patent, is—

1. A soldering apparatus for band-saws, comprising a frame $a$, $b$, $c$, clamps provided thereon for holding a saw-blade in place, a fireproof casing mounted on guides and adapted to slide into proximity with or away from the saw-blade, an upper and a lower pressure-jaw adapted to exert pressure on the newly-soldered joint, and means which cause, firstly the closing of the jaws when the casing is being moved away from the saw-blade, and secondly the opening of the jaws when the casing is being moved over the saw-blade, substantially as and for the purposes set forth.

2. Soldering apparatus for band-saws, comprising in combination with a frame and clamps, a fireproof casing slidably supported in a guide of the said frame, a hand-lever pivoted to the latter, a pressing-jaw provided on the hand-lever, another pressing-jaw pivoted to the frame, and means for connecting this jaw with the said lever, substantially as and for the purpose described.

In testimony whereof I have signed my name to this specification in the presence of two subscribing witnesses.

GG. OTT.

Witnesses:
 WM. HAHN,
 ERNST ENTENMAN.